A. L. COLLINS.
METHOD OF MEASURING THE VISCOSITY OF FLUIDS.
APPLICATION FILED AUG. 26, 1914.

1,224,142.

Patented May 1, 1917.

WITNESSES:
Rob't H. Anderson.
Ray J. Chapman.

INVENTOR
Arthur Lee Collins

UNITED STATES PATENT OFFICE.

ARTHUR LEE COLLINS, OF SAN FRANCISCO, CALIFORNIA.

METHOD OF MEASURING THE VISCOSITY OF FLUIDS.

1,224,142.   Specification of Letters Patent.   Patented May 1, 1917.

Application filed August 26, 1914. Serial No. 858,700.

*To all whom it may concern:*

Be it known that I, ARTHUR LEE COLLINS, a citizen of the United States, residing at San Francisco, county of San Francisco, State of California, have invented a new and useful Method of Measuring the Viscosity of Fluids, of which the following is a specification.

My invention relates to a method of measuring the resistance to flow offered by fluids in motion. Every known fluid offers a resistance, analogous to friction, to the relative sliding motion of any two adjacent layers. The physical property of the fluid to which this is due is commonly called viscosity.

In the analysis of the cause of fluid resistance there are two terms more frequently used, namely, adhesion, or the force causing a liquid to adhere to a surface, cohesion, or the force causing the integrate particles of the liquid to adhere to each other. Surface tension is probably the resultant of cohesion and is a force which tends to retain and define the surface of a liquid in contact with another liquid or gas.

In the flow of liquids in tubes, the portion of the liquid in the central zone of the tube is subjected to the resistance offered by cohesion. On the other hand, the layers, adjacent to the walls, are subjected to the influence of both adhesion and cohesion. The resistance offered to the liquid when the liquid is in motion is due to adhesion and cohesion. The layers of the liquid in the proximity of the tube walls are subjected to a greater resistance than the layers in the central zone of the tube.

I have devised a simple and novel method whereby the relative viscosity of a liquid, in contact with different kinds of surfaces and under different temperatures, and the relative viscosity of liquids with varying thicknesses of films under different conditions of temperature and in contact with different surfaces can be determined.

Figure 1:
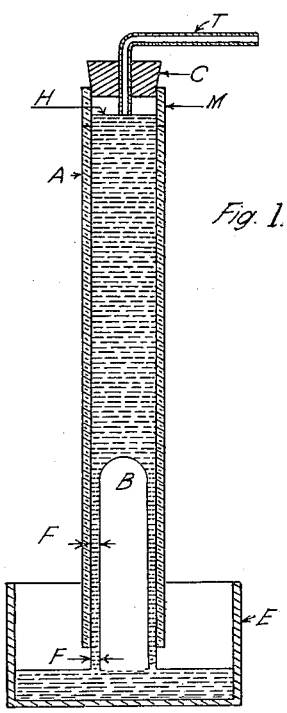
Figure 2:
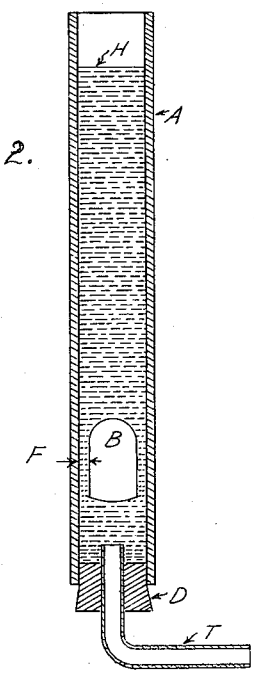

In the accompanying drawing, Figure 1 is a vertical section of an apparatus for carrying out my improved method; Fig. 2 is a similar view of a modification thereof.

In Fig. 1 A is a tube, C is a stopper. M is a transparent wall in the vicinity of the surface H of the liquid. E is a vessel containing the fluid to be tested. T is a tube connected to a suction pump. The pump is not shown. The tube T projects into the main tube an inch more or less. First, the fluid to be tested is caused to fill the tube to height H by the operation of the vacuum pump. Then by lowering the vessel E or raising the tube A the column B rises to the top of the tube. The purpose of the projecting tube T is to prevent opaque liquids from covering the entire inner surface of the apparatus, and thereby preventing the observation of the arrival of the air column at the surface of the liquid. The rate of travel of the column B is a measure of the viscosity of the liquid.

In Fig. 2, A is a tube closed at the bottom D and filled to a point H with the fluid to be tested. T is a tube for the purpose of inserting an air column taken from an air pump. The pump is not shown. The rate of travel of the column of air in the tube is a measure of the viscosity of the liquid.

The apparatus, or any portion of the same, may be of glass, metal, or composition of materials.

The apparatus is not limited by shape and size, nor the enlargement, alteration, extension and rearrangement of any part thereof. The forms of apparatus that can be devised are unlimited.

The moving column may consist of air, gas or substance with buoyancy different from the buoyancy or gravity of the fluid to be tested.

By providing tubes of different diameters, and tubes with surfaces of different materials, and testing the liquids at different temperatures, the characteristic viscosity relations of the liquid can be established for the given conditions.

I claim as my invention:

1. The method of testing the viscosity of liquids which consists in admitting to the lower end of a tube filled with the liquid a bubble of air or gas and noting the time required for the bubble to rise a determined distance.

2. The method of testing the viscosity of liquids which consists in elevating a tube filled with the liquid and having its upper end closed against the admission of atmospheric pressure and its open lower end immersed in the liquid until an air bubble is admitted to the lower end of the tube, and then noting the time required for the bubble to rise a determined distance.

ARTHUR LEE COLLINS.

Witnesses:
RAY J. CHAPMAN,
ROBT. S. ANDERSON.